United States Patent [19]
Andrews et al.

[11] Patent Number: 6,105,062
[45] Date of Patent: Aug. 15, 2000

[54] METHOD AND SYSTEM FOR PRUNING AND GRAFTING TREES IN A DIRECTORY SERVICE

[75] Inventors: Cary F. Andrews, West Jordan; David O. Cox, Orem; A. Wayne Long, Taylorsville; David A. Romanek, Mapleton; Steven S. McLain, Provo, all of Utah

[73] Assignee: Novell, Inc., Provo, Utah

[21] Appl. No.: 09/031,175

[22] Filed: Feb. 26, 1998

[51] Int. Cl.[7] .................................................. G06F 17/30
[52] U.S. Cl. .......................... 709/223; 707/10; 707/101; 707/102; 707/103
[58] Field of Search .............................. 709/223; 707/10, 707/101, 102, 103

[56] References Cited

U.S. PATENT DOCUMENTS

| | | | |
|---|---|---|---|
| 5,230,047 | 7/1993 | Frey, Jr. et al. | 714/4 |
| 5,454,101 | 9/1995 | Mackay et al. | 707/3 |
| 5,493,678 | 2/1996 | Arcuri et al. | 707/1 |
| 5,608,903 | 3/1997 | Prasad et al. | 707/10 |
| 5,677,851 | 10/1997 | Kingdon et al. | 709/229 |
| 5,701,137 | 12/1997 | Kiernan et al. | 345/340 |
| 5,758,344 | 5/1998 | Prasad et al. | 707/10 |
| 5,764,911 | 6/1998 | Tezuka et al. | 709/223 |
| 5,832,487 | 11/1998 | Olds et al. | 707/10 |
| 5,878,434 | 3/1999 | Drapper et al. | 707/202 |
| 5,956,718 | 9/1999 | Prasad et al. | 707/10 |
| 6,018,741 | 1/2000 | Howland et al. | 707/102 |

OTHER PUBLICATIONS

Novell NetWare 4.0 Supervising the Network, NetWare Network Computing Products, Ch. 8, Backing up and Restoring Data, pp. 509–581, Novell, Inc., Mar., 1993.
Netware Online Documentation System, Managing, pp. 1–24, Novell, Inc., 1993.
DS Standard NDS Manager Data Sheet and related World Wide Web pages (10 pages total), Computer Associates, World Wide Web Publication, publication date unknown.

Primary Examiner—Dung C. Dinh
Assistant Examiner—Abdullahi E. Salad
Attorney, Agent, or Firm—Dinsmore & Shohl LLP

[57] ABSTRACT

A method and system for moving a subtree of objects from a source location to a destination location. The method includes receiving an input identifying a subtree at a source location. The subtree includes a parent object and exists in a hierarchical tree of objects. The directory includes object containment rules which prohibit certain parent/child relationships among the objects. An input signal identifying a destination location in a destination tree is received. A destination location includes a destination object to which the subtree will be subordinate. The parent object of the subtree is modified to an object type sufficient to comply with object containment rules, and the subtree is moved from the source location to the destination location. The present invention can handle both intra-tree and inter-tree moves of subtrees. Containment rule violations are eliminated, and if the move crosses schema boundaries, the schemas are compared and reconciled to eliminate problematic differences between the schemas.

24 Claims, 5 Drawing Sheets

METHOD AND SYSTEM FOR PRUNING AND GRAFTING TREES IN A DIRECTORY SERVICE

FIELD OF THE INVENTION

This invention relates generally to management of a computer network, and more particularly concerns management of network entities through the use of a directory tree.

BACKGROUND OF THE INVENTION

Computer networks have traditionally been relatively difficult to administer, especially as they grow in physical size and in the number of network-attached entities. One relatively recent advance in administering networks is the directory service. A directory service associates a data structure, such as an object, for each network entity managed by the service. Each object maintains information about a network entity. Some directory services organize these objects into a hierarchical tree structure that simplifies overall management of such entities. The hierarchical tree structure that can be graphically presented to visually illustrate the parent/child relationships between the entities. The advantages of a good directory service has become such an important aspect of a network operating system that network operating systems are frequently purchased solely on the strength of their directory service capabilities.

Some vendor's directory service products allow the directory to be distributed across various servers on a network. One directory service product, NOVELL DIRECTORY SERVICES (NDS), categorizes each object in the tree as either a container object or a leaf object. A container object can be a parent to other container objects, and to zero or more leaf objects. Container objects are typically used to provide a logical organization to the tree, while the leaf objects represent actual network entities, such as servers, printers, facsimile machines, and users.

Objects are created, or "instantiated" from a class definition that defines the default attributes associated with each respective object type. Class definitions are maintained in a data structure referred to as a schema. Each directory tree has its own schema, and more than one schema may be associated with a particular directory tree.

A directory service typically imposes certain containment rules that govern the relationships between objects in the tree. For example, container rules prohibit a container object from being subordinate to a leaf object. Moreover, certain types of container objects, such as an Organization container object cannot be subordinate to an Organization Unit container object. Containment rules help ensure a logical and therefore intuitive structure of the tree and are maintained in the schema.

A directory may administer hundreds or even thousands of network entities. Consequently, directory trees can become very large, and without a logical organization, administering a network entity can become quite cumbersome. For this reason, container objects are used to create logical nodes in the directory tree. For example, a directory may have a respective Organization container as the root, or parent, node for each separate country in which the organization has facilities. Immediately subordinate to the Organization container, there might be one or more Organization Unit objects to further subdivide the respective organization into one or more logical divisions, such as marketing, engineering, and research departments. The directory tree may branch out indefinitely until it terminates with one or more leaf objects, each of which typically represents an actual network entity. Management or administration of a particular object typically involves traversing a graphical representation of the tree, further necessitating a logical order to the tree structure.

Sometimes it would be useful to move a group of objects that share a common node from one location within a tree to another location. For example, an organization may have several directory trees on a network, such as a production directory tree and a test directory tree. It may be desirable to copy a subtree of objects from the production directory tree to the test directory tree for testing purposes. Or it may be desirable to move a subtree of objects within the same tree. For example, due to a company reorganization, it may be useful to move a subtree from one location within the tree to another location within the tree to accurately reflect a new reporting hierarchy. In either of these situations, such a move may violate containment rules and therefore be prohibited. For example, if the subtree has an Organization-type object as its root node, and it is to be moved subordinate to either another Organization-type object, or to an Organization-type Unit object, such a move would be prohibited by containment rules. Consequently, the objects must be deleted from their initial location and then added at the desired location. This can take considerable time, and is fraught with the potential for introducing erroneous data into the attributes associated with the object.

In addition to containment rule problems, moving objects, or groups of objects such as a subtree, across schema boundaries, whether intra-tree or inter-tree poses other problems as well. An object in a directory tree is created from a template, or class, which is defined in the schema associated with the tree. The class definition of an Organization-type object in a source directory tree may differ from the class definition of an Organization-type object in a destination directory tree. For example, the class that defines an Organization-type object in the source directory tree may include a primary contact attribute, while the class that defines an Organization-type object in the destination directory tree lacks such an attribute. Thus, when moving an Organization-type object from the source directory tree to the destination directory tree, a problem arises as to how to maintain in the destination directory tree the primary contact information that is maintained in the source directory tree. Conventional directory service products fail to address these issues.

U.S. Pat. No. 5,608,903 discloses a method for moving a subtree of objects within a directory, but does not allow moves that would violate containment rules, nor does it suggest moving a subtree across schema boundaries.

It is apparent that a method and system that allow a move of a subtree irrespective of the containment rules of a directory, and, ensure migration of all object attribute information when a move crosses schema boundaries would be highly beneficial, and would further simply network directory management.

SUMMARY OF THE INVENTION

It is one object of this invention to provide a method and system for moving a subtree of directory objects from a source directory tree to a destination directory tree.

It is another object of the present invention to provide a method and system for moving a subtree from a source location in a directory tree to a destination location in a directory tree regardless of directory containment rules.

It is yet another object of the present invention to provide a method and system for moving a subtree from a source directory tree to a destination directory tree and ensuring that all attributes associated with the object are transferred from the source directory tree to the destination directory tree.

It is still anther object of the present invention to provide a method and system for moving a subtree of objects across schema boundaries.

To achieve the foregoing and other objects and in accordance with the purposes of the present invention, as embodied and described herein, the method according to one embodiment of this invention includes receiving a request to move a subtree from a source location in a source directory tree to a destination location in a destination directory tree. The identification of the destination location includes the specification of a destination object to which the parent object of the subtree will be immediately subordinate after the move. If necessary, the object type of one or more of the objects in the subtree is changed such that the location of the objects in the destination directory tree will not violate object containment rules. The objects in the subtree are then moved from the source directory tree and "grafted" at their specified location in the destination directory tree. The subtree is then "pruned," or removed from the source directory tree. The source and destination directory trees can be different directory trees or can be the same directory tree.

According to one embodiment of this invention, the schema associated with the destination directory tree is compared to the schema associated with the source directory tree. If the schemas differ, classes that do not exist in the destination directory schema are added to the schema from the source directory schema. Similarly, if the destination directory schema lacks attributes present in the source directory schema, such attributes are added to the destination directory schema so that all data associated with the objects in the subtree can be moved from the source directory to the destination directory.

Prior to moving the subtree to the destination directory tree, it is determined whether the move will cause naming conflicts between objects in the subtree and existing objects in the destination directory tree. If so, the parent object of the subtree is renamed to avoid naming conflicts.

According to one embodiment of this invention, the parent object of the subtree is mutated to an unrestricted object type, moved to the destination directory tree, and then mutated to an object type such that containment rules in the destination directory tree are not violated.

The present invention achieves the ability to move or copy a subtree of objects from a source directory tree to a destination directory tree without the need to manually create each object in the subtree. If the move from one tree to another tree would violate containment rules, the objects in the subtree are changed to a type sufficient to comply with the containment rules. If the move crosses schema boundaries, the two schemas are compared and reconciled.

The present invention can also be embodied as a system that includes a source directory tree and a destination directory tree. A subtree is identified in the source directory tree and a destination location is identified in the destination directory tree. The source and destination directory trees can be different trees or can be the same tree. The system includes a processor that is operative to execute program instructions which are capable of performing the steps of determining if copying the subtree to the destination location will violate object containment rules associated with the destination directory tree, if necessary, modifying one or more objects in the subtree to an object type sufficient to comply with the object containment rules of the destination directory tree, copying the subtree from the source location to the destination location, and removing the subtree from its source location.

Still other objects of the present invention will become apparent to those skilled in this art from the following description wherein there is shown and described preferred embodiments of the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to present preferred embodiments of the invention, examples of which are illustrated in the accompanying drawings, wherein like numerals indicate the same elements throughout the views.

DETAILED DESCRIPTION OF PREFERRED EMBODIMENTS

Figure 1:
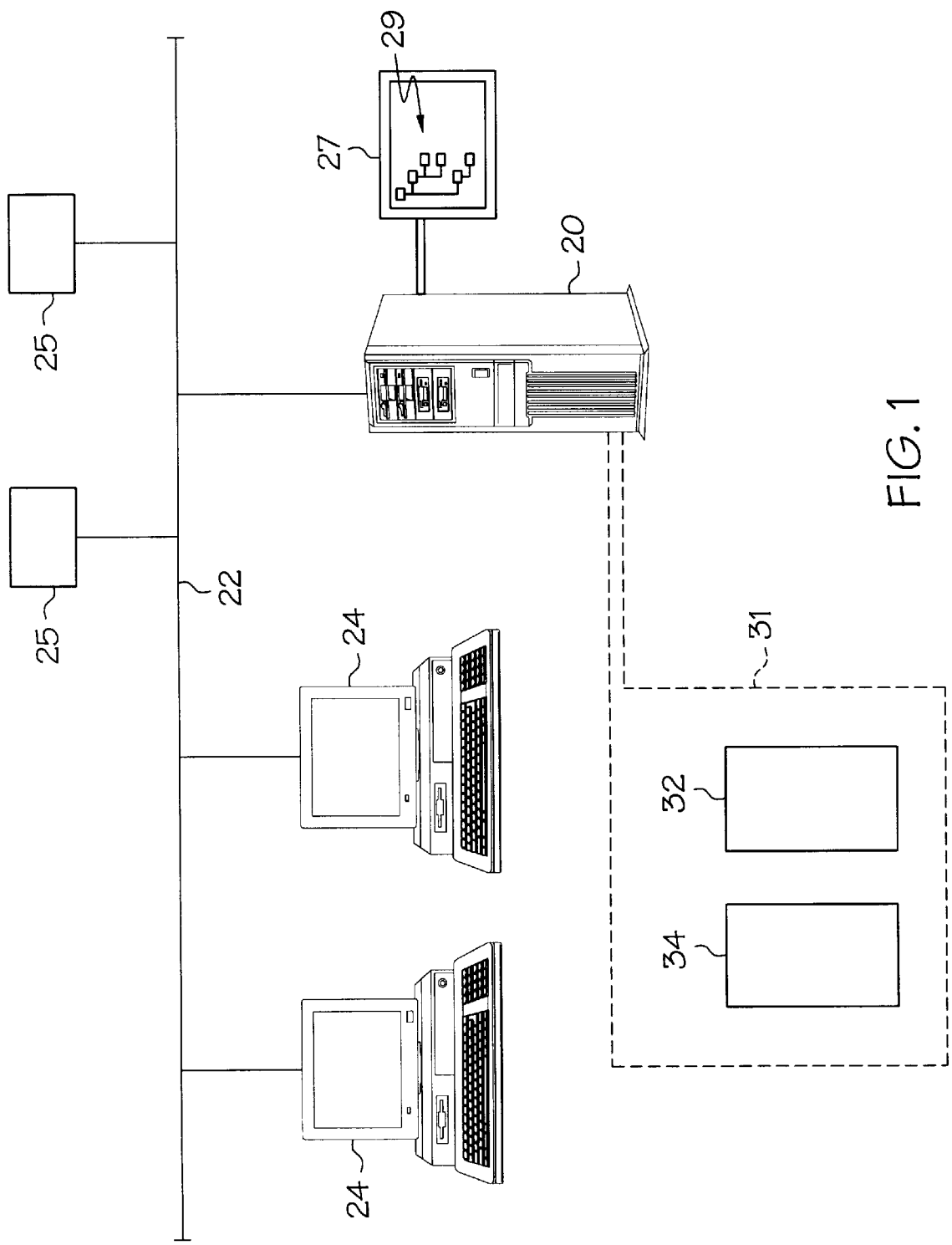
FIG. 1 is a diagram of an environment in which the present invention preferably operates.

Maintaining networked-attached entities as objects in a hierarchical tree structure simplifies administration of the entities. Through logical and intuitive ordering of the objects, an administrator can quickly locate the desired object of interest. One directory service product that uses such a tree structure for network entity administration is Novell Corporation, Inc.'s NOVELL DIRECTORY SERVICES (NDS). Each network entity, such as a printer, a computer, a file server and the like is represented in the tree as a particular type of object. Objects that represent actual network entities are referred to as "leaf" objects, as these objects are located at the ends of the "branches" of the tree. Leaf objects extend from, or are subordinate to, container objects. Container objects are used to provide a logical order to the tree structure. For example, each computer within a particular group of an organization, such as the engineering group, may be organized under an Organization-type Unit container object entitled ENGINEERING. Each computer in the engineering group will be represented by a leaf object that is subordinate to the ENGINEERING object. The ENGINEERING object, a R&D object and a MARKETING object may all be immediately subordinate to an Organization-type container object entitled NORTH AMERICA. The NORTH AMERICA object may be at the same relative level in the directory tree as the CANADA and EUROPE objects, each of which could have subordinate ENGINEERING, R&D and MARKETING objects. In this manner, container objects can be used to provide a logical and intuitive order to the hierarchical directory tree.

Directory service products typically impose containment rules which govern the relationships that different types of objects can have with each other. Such containment rules prohibit certain types of parent/child relationships among different types of objects. For example, a Printer-type object cannot be a parent object to an Organization-type object. Likewise, an Organization-type object cannot be subordinate to another Organization-type object. These containment rules help ensure that a directory tree has a logical and sensible structure, which aids in the overall administration of the network.

When an object is added to a tree, it is typically instantiated from a template or class, which provides default functionality and attributes for the object. Attributes are used to store information relating to the object. The classes are stored in a data structure referred to as a schema. A schema may define the classes for a whole directory tree, or a portion of a directory tree. Thus, a directory tree may have multiple schemas. The schema includes the classes as well as the containment rules defining the parent/child relationships that are permitted among objects. Robust directory service products, such as NDS, permit the programmatic extension of a schema to allow additional attributes to be added to a class. For example, a site that determines that additional information must be maintained for each printer on the network can extend the default printer class provided by NDS to include such attributes.

Moves of objects across schema boundaries, whether inter-tree or intra-tree, pose problems because of potential differences between the schemas. A class definition for an object in the first schema may differ from the class definition for an object in the second schema. In fact, the second schema may not even have a class that corresponds to a particular object-type from the first schema.

Referring now to FIG. 1, a server 20 is shown coupled to a network 22. Also coupled to network 22 are workstations 24 and printers 25. Although not shown, network 22 would likely be one segment of an organization-wide network of local area networks and wide area networks. A display device 27 is coupled to server 20, and a graphical representation of a directory tree 29 is shown on the display device 27. The directory tree 29 illustrates a hierarchical tree of various objects associated with the organization's network. Although the display device 27 is shown coupled to server 20, the present invention could also be executed over the network 22 from a workstation 24. Although not shown, directories are frequently distributed, meaning that portions of the directory are stored on different servers. Such portions are frequently referred to as partitions. Thus, server 20 may have one or more partitions while other servers on the network contain different partitions of the network. Regardless of where the partition physically exists, the directory tree 29 will include a representation of each object managed by the directory service.

The present invention will operate in a conventional computer, such as those available from any number of commercial computer manufacturers, and can be implemented in a variety of different programming languages, such as C, C++, or JAVA. One embodiment of the present invention is embodied as program instructions which execute in a run-time environment 31 associated with the server 20. The present invention may be embodied as one or more running processes 32, 34 executing in the run-time environment 31. In a preferred embodiment, the invention is embodied as a component of NDS.

While only five network entities are shown attached to network 22, typically an organization will have hundreds or even thousands of different network entities, such as computers, user identifiers, servers and the like. Thus, directory tree 29 can comprise hundreds or thousands of different objects. Not only are the actual network entities represented in directory tree 29, but, as discussed above, container objects to provide organization to directory tree 29 also exist. Consequently, the directory tree 29 may be extremely large.

Sometimes it is necessary for an administrator to copy or move one or more objects from one location in a directory tree to another location in a directory tree. For example, during corporate reorganizations it is not unusual to have to reorganize operating units. In such an instance, it is desirable to modify the directory tree to reflect the layout of the reorganized organization. Rather than individually moving each object, which could entail hundreds of individual move operations, it would be desirable to move subtrees of objects in a single move operation. The word subtree will be used herein to refer to a container object and all its subordinate objects. A subtree can be a portion of a tree, or, if the root-most node of the tree is selected, the subtree can be the entire directory tree.

It is not uncommon for organizations to maintain multiple directory trees. For example, a test environment may exist in which a separate directory tree is used to test various aspects of the network operating system or the directory service. It would frequently be convenient for an administrator to be able to copy or move an object, or a subtree of objects, from one directory tree to another directory tree. The present invention provides a method and system for copying or moving a subtree of objects from one location in a tree to another location in the same tree, and for copying or moving an object, or subtree of objects, from one tree to another tree. The present invention eliminates the problems encountered when such a move would violate containment rules. When the move of the subtree crosses schemas, whether inter-tree or intra-tree, the present invention compares and reconciles the schemas and ensures that all object attributes are successfully moved to the destination directory tree. Moreover, the present invention moves large numbers of objects with a single move command, eliminating the need to individually move each object. While the word move is used throughout the specification, it will be appreciated that a move operation is essentially a copy operation that is followed by a removal operation of the objects from their source location. Thus, the present invention encompasses both moving and copying subtrees from a source location to a destination location.

Figure 2:
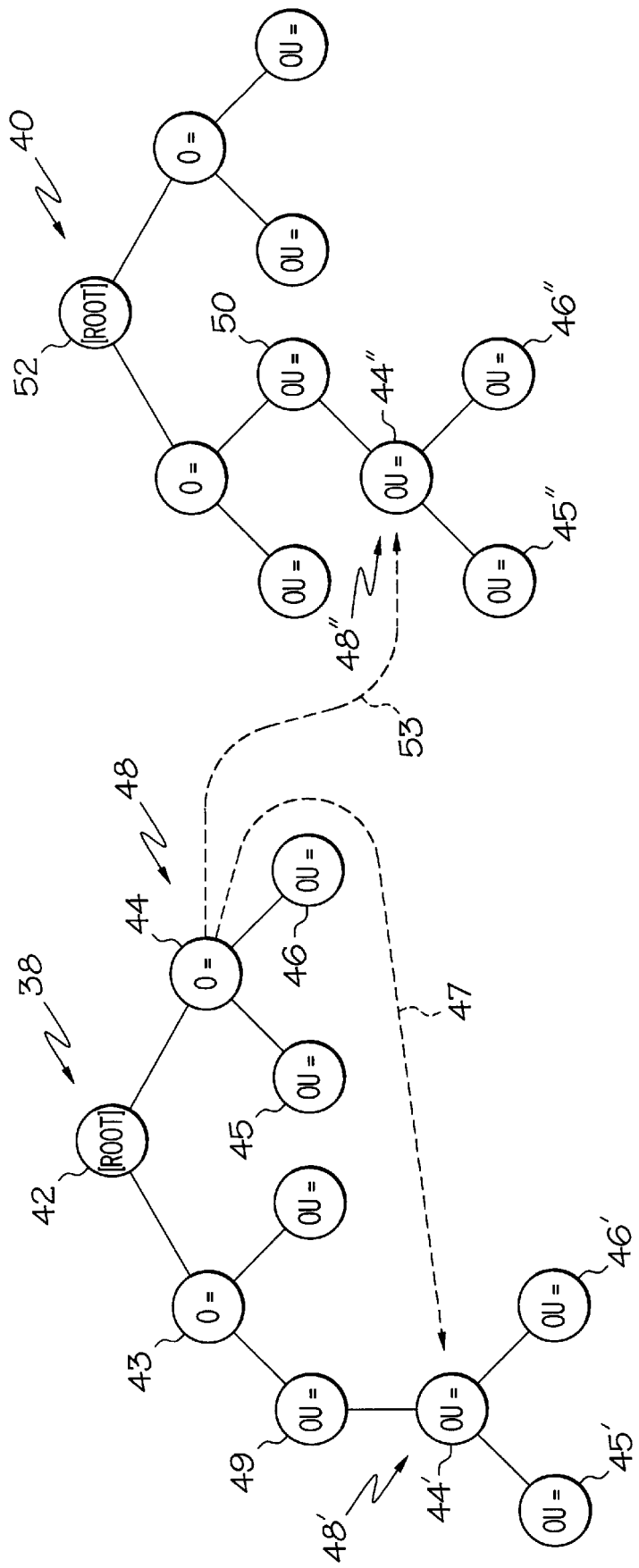
FIG. 2 is a diagram of a source tree and a destination tree illustrating potential moves of a subtree according to one embodiment of this invention.

Referring to FIG. 2, a source directory tree 38 and destination directory tree 40 are shown. The root-most object of source directory tree 38 is object 42. Subordinate to object 42 are Organization-type container objects 44 and 43. Thus, object 42 has a parent relationship to its children objects 43, 44. Organization-type objects 43, 44 may represent a logical or physical division of an organization. For example, objects 43 and 44 may each represent a different country in which the organization maintains an office. Subordinate to object 44 are Organization Unit-type container objects 45 and 46. Such objects may be further logical or physical subdivisions within the particular country represented by object 44. Although not shown, additional objects would typically be subordinate to Organization Unit-type objects 45 and 46. Ultimately, each "branch" would typically terminate with one or more leaf objects that represent network entities such as computers, file servers, user identifiers and the like.

A subtree is a portion of a directory tree that includes a container object and all of its subordinate objects. For example, subtree 48 comprises objects 44, 45, 46, and any objects subordinate thereto. Object 44 is the root node of subtree 48. Source directory tree 38 is also a subtree since all objects within tree 38 are subordinate to the root-most container object 42. FIG. 2 illustrates a before-and-after image of a move of subtree 48 from a source location to a destination location within directory tree 38. Subtree 48' represents subtree 48 after it has been moved from a location subordinate to object 38 to a location subordinate to object 49. Objects 44', 45', and 46' represent moved objects 44, 45 and 46 respectively. After the move, subtree 48 would typically be 'pruned' or removed from source directory tree 38. Similarly, subtree 44 could be moved from source directory tree 38 to destination directory tree 40, as represented by subtree 48". Again, all of subtree 48, including objects 44, 45 and 46 are moved to directory tree 40, as represented by objects 44", 45" and 46".

When object 44 of subtree 48 was moved to the location indicated by object 44', the present invention changed the object's type from an Organization-type object to an Organization Unit-type object. This was done because containment rules associated with directory tree 38 prohibit an Organization-type object from being subordinate to an Organization Unit-type object. The present invention, as described in more detail below, thus modifies the object type of any object in the subtree as necessary to comply with containment rules of the destination directory tree.

An object in a directory tree, such as object 44 for example, is created, or instantiated from a class that is defined in a schema associated with source directory tree 38. Each class defines the default data items, or attributes, that are associated with a particular type of object. The schema also contains the containment rules which govern the permissible parent/child relationships among different types of objects. One problem with moving subtree 48 from source directory tree 38 to destination directory tree 40 is that the class definitions contained in the schema associated with source directory tree 38 may include attributes which are not defined in the corresponding classes of the schema associated with destination directory tree 40. Without such attributes, information associated with objects in subtree 48 cannot be moved to destination directory tree 40. To ensure that all object data is moved, if the method and system of the present invention determine that attributes exist in classes in source directory tree 38 that do not exist in corresponding classes associated with destination directory tree 40, such attributes will be added to the class definition of the schema associated with destination directory tree 40. In addition to a difference between attributes, entire classes may exist in source directory tree 38 that do not exist in destination directory tree 40. The present invention will similarly ensure that the schema associated with destination directory tree 40 is enhanced to include such classes.

In advanced directory service products, a single directory tree can have multiple schemas. Thus, this reconciliation process is utilized when the move will cross schema boundaries, whether the source and destination directory trees are the same tree, or are different trees.

Figure 3:
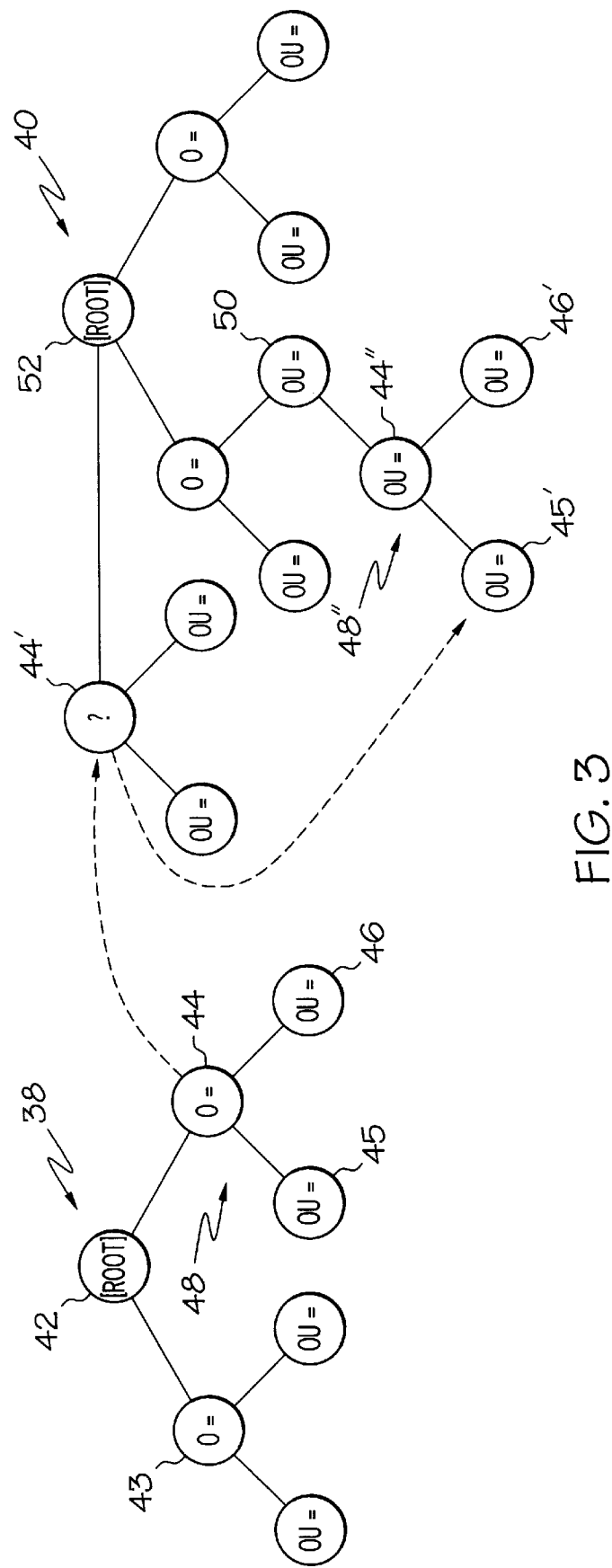
FIG. 3 is a diagram of a source tree and a destination tree illustrating in greater detail a move of a subtree from a source tree to a destination tree.

FIG. 3 illustrates a before-and-after image of a move of subtree 44 from source directory tree 38 to destination directory tree 40. Subtree 44' represents an intermediate location of subtree 44 in the move process, and subtree 44" represents the destination location of subtree 44. First, a user identifies the subtree to be moved. This is preferably achieved by displaying a graphical representation of the directory tree on a display device as shown in FIG. 1, allowing a user to utilize a user selection device, such as a mouse, to select the subtree to move. The user can select the root node of the subtree that it wishes to move and indicate, via a button for example, that a move operation is desired. While a graphical user interface is preferable for this purpose, it is apparent to those skilled in the art that other input signals could be used to select the subtree to move, such as, for example via a programmatic interface that identifies the subtree and the desired destination location, or via a batch file. After the subtree is identified, a destination location is similarly identified. Again, if a graphical user interface is used, the user can select a particular object in the destination tree which represents the object to which the root object of the subtree will be subordinate after the move. With regard to FIG. 3, the user selected subtree 48, such as by selecting object 44. The user also selected object 50 in destination directory tree 40 as the destination object to which object 44 (and thus subtree 48) will be subordinate after the move.

After the subtree and destination location have been identified, the method according to one embodiment of this invention then analyzes the name of the root object of the subtree, in this example object 44, and determines whether the name of object 44 will conflict with a name of any object in destination directory tree 40. If a naming conflict exists, the object name of object 44 is modified to eliminate the conflict. Because the move of Organization-type object 44 to a location such that it is subordinate to Organization Unit-Type object 50 would violate containment rules associated with destination directory tree 40, the object type of object 44 is changed to an UNRESTRICTED object type. An UNRESTRICTED object type is a special object type that can exist anywhere in a tree without violating containment rules. In NDS such an object type is referred to as an UNKNOWN object type. The schema associated with source directory tree 38 is copied to a storage device, such as a disk drive, to provide a current snap-shot of the schema. The subtree 48 is then copied to an intermediate location on the storage device. The schema associated with source directory tree 38 is then compared to the schema associated with destination directory tree 40. If subtree 48 contains objects created from classes that are not defined in the schema associated with destination directory tree 40, those classes are copied from the schema associated with source directory tree 38 into the schema associated with destination directory tree 40. Any attributes that exist in a class in the source directory schema that are missing from a corresponding class in the destination directory schema are added to the destination directory schema. The subtree can then be restored from the intermediate location to a location that is immediately subordinate to the root-most object of the destination tree (object 52), as illustrated by subtree 44'. Subtree 44' is then moved to its final target location represented by subtree 44". Object 44" is then modified from an UNRESTRICTED object type to an object type that will conform to the containment rules of destination directory 40, such as an Organization Unit-Type object. Subtree 48 can then be pruned from source directory tree 38.

Accordingly, through use of the present invention, a subtree of objects can be seamlessly and automatically moved from a source location to a destination location, eliminating the need to manually delete and recreate objects, as required by conventional directory service products. Moreover, by resolving naming conflicts and mutating the object types as necessary to comply with containment rules, such a subtree move can occur even where containment rules or naming conflict rules would otherwise prohibit such a move.

Figure 4A:
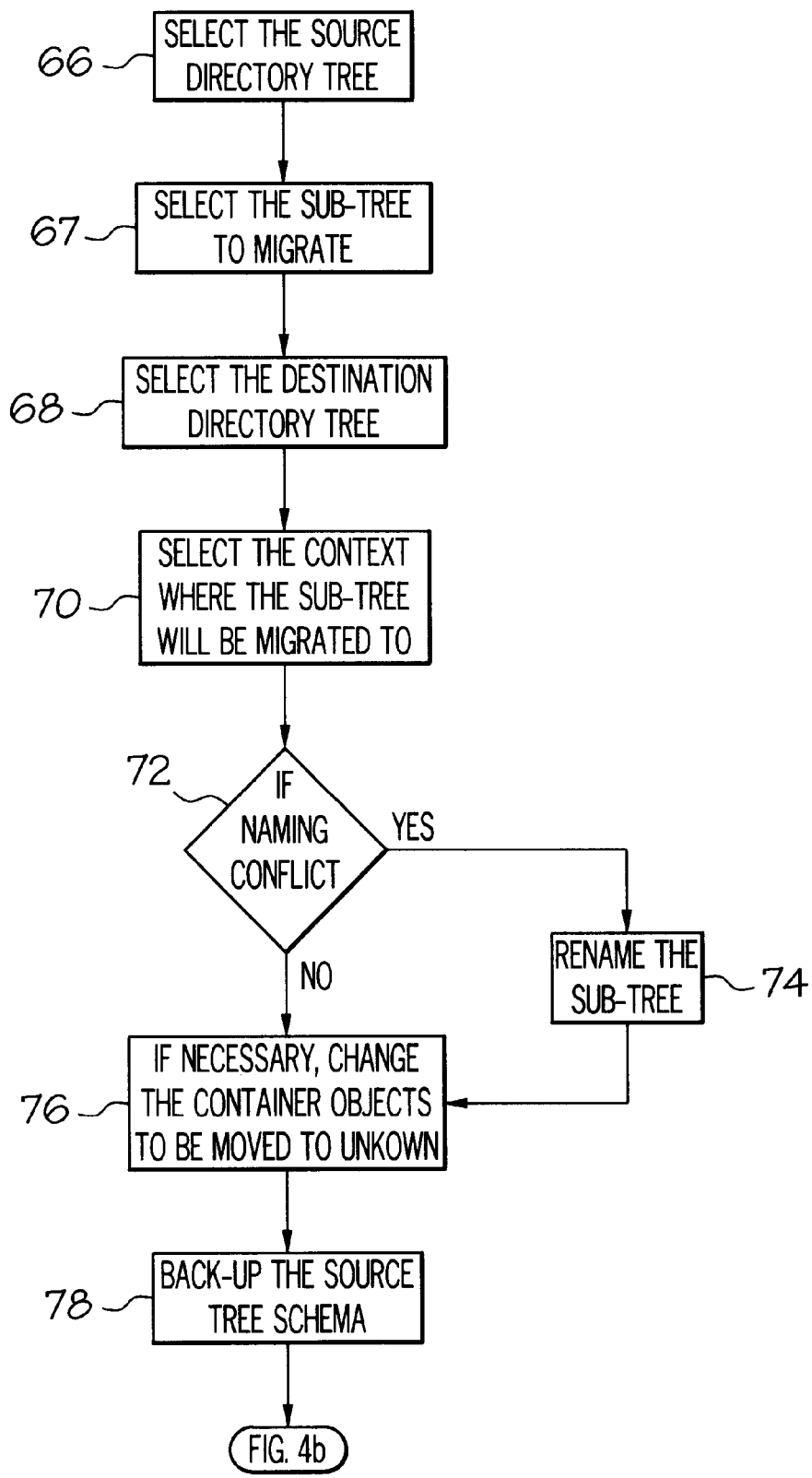
FIGS. 4a and 4b are flowcharts illustrating a method for implementing one embodiment of the present invention.
Figure 4B:
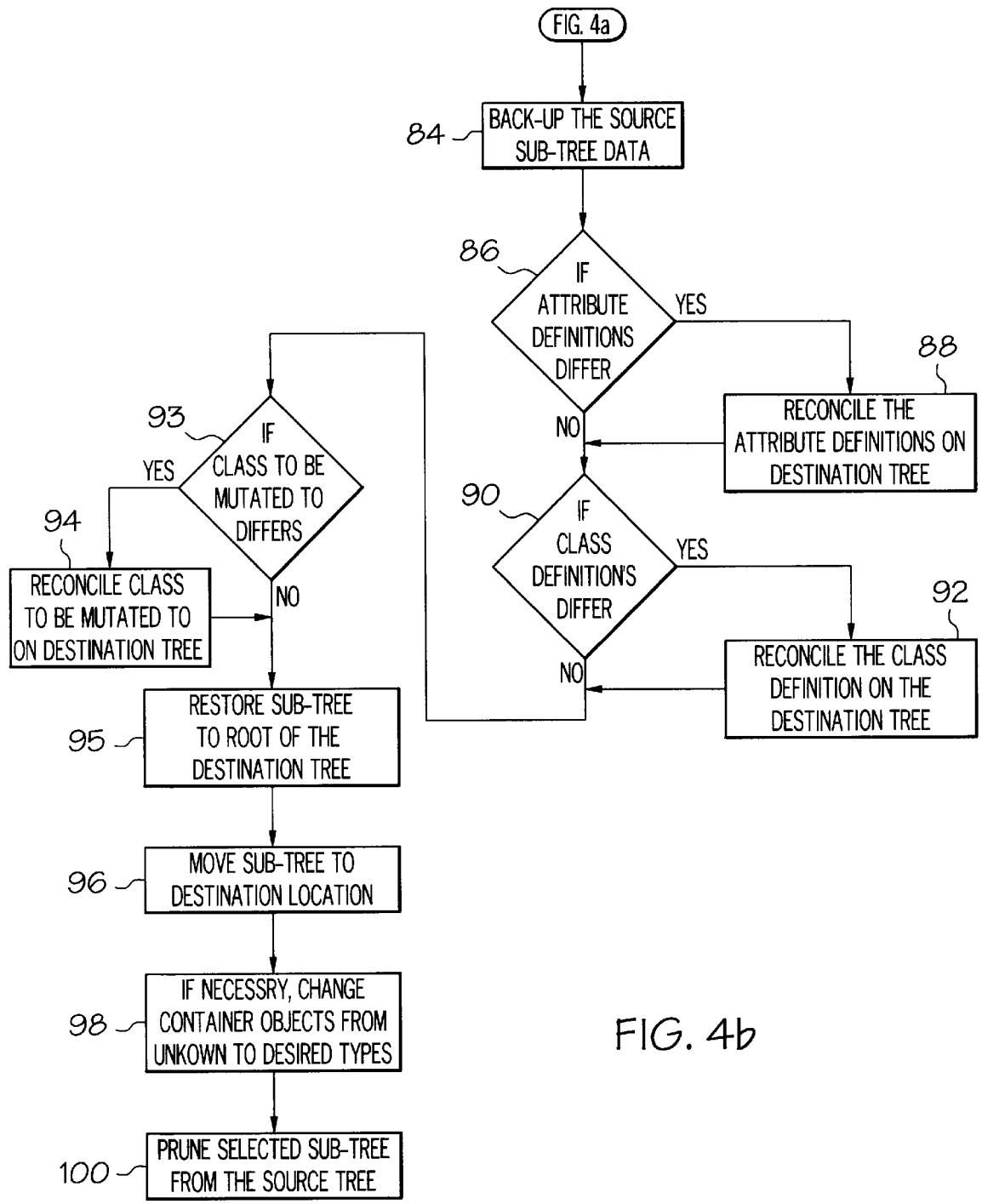

FIGS. 4a–4b illustrate a method according to one embodiment of this invention for moving a subtree from a source directory tree to a destination directory tree. At block 66 the source directory tree is selected. As discussed previously, this selection can comprise selection via a graphical user interface, selection via a batch interface, programmatic selection via a function call, or through any other type of identification of an entity known to those skilled in the art. At block 67 the subtree to be moved is selected. The selection mechanism can comprise the same selection mechanism discussed with regard to selecting the source directory tree. At block 68, the destination directory tree is similarly selected. The destination directory tree can be either a separate directory tree from the source directory tree or can be the same directory tree as the source directory tree. In the illustration shown in FIGS. 4a–4b, it is assumed that the source directory tree is a different directory tree from the destination directory tree.

At block 70 the destination location in the destination tree is selected. Typically the destination location will be selected by indicating an object in the destination tree to which the subtree will be immediately subordinate after the move operation. At block 72, it is determined whether the name of the root object in the subtree to be moved will conflict with the name of any object in the destination tree. If the answer is yes, then at block 74 the root object of the subtree is renamed to eliminate a naming conflict. In an NDS environment, an object's fully qualified name is composed of the name of the respective object, as well as the name of each parent object through the root-most object of the tree. Thus, renaming the root object of the subtree will affect the fully qualified name of each subordinate object within the subtree. Another mechanism to ensure unique names would be to individually apply a unique name to each respective object of the subtree.

While the method and system described herein can be applied to any hierarchical directory service, FIGS. 4a–4b will be described with respect to Novell Corporation Inc.'s NDS product, and the examples illustrated herein refer to the NDS system. Pseudo code describing the renaming of an object is as follows:

If (namingConflict)
{
    newName=oldName +_+ treeName;
    DSModifyQualifiedName(oldName, newName);
}

After the naming conflict has been eliminated, or if no naming conflict will exist, then at block 76 it will be determined if the move of the subtree will violate containment rules. This can be determined by examining the class of the root object of the subtree and determining the types of objects to which the root object can be subordinate. The object-type of the object to which the subtree will be subordinate after the move is then examined. If the root object cannot be subordinate to such object-type, the root object of the subtree will be changed to an UNRESTRICTED-type object. In the NDS environment, the UNRESTRICTED-type object is referred to as an UNKNOWN-type object. Modifying the object type is sometimes referred to as a "mutation" of the object type. The object type can then be mutated to an UNKNOWN-type object to avoid containment rule violations. As discussed, if the move of the subtree will not violate containment rules, a mutation of the object type is not necessary. UNKNOWN-type objects are permitted to be subordinate to any type of object, thus eliminating potential containment rule violations. If other objects within the subtree would likewise violate the containment rules, then those objects too are mutated to UNKNOWN-type objects. Although the precise syntax for mutating an object to an UNRESTRICTED-type object will differ among various directory service products, the directory service product should provide some mechanism for allowing an object to be subordinate to any other object in the tree regardless of containment rules.

At block 78 the schema associated with the source tree is copied. Typically the copy will be made to a persistent storage device, such as a hard drive. The schema contains the class definitions which are used to instantiate objects of the directory tree, as well as the containment rules which establish permissible parent/child relationships among the object types. While mechanisms for copying a schema can differ among different vendors, typically such a copy function is provided through a documented backup procedure, or through publicly available and documented API calls.

At block 84 the subtree of objects is copied to a persistent storage device, such as a disk drive. Such a copy can be made through various mechanisms. For example, most network directory systems provide a mechanism for backing up the objects in the tree. The backup mechanism associated with the particular network directory service can be used as a mechanism for copying the subtree to the persistent storage device. Pseudo code for looping through and backing up each object in the subtree is as follows:

while (moreObjectsToBeBackedUp)
{
    DSBackupObject(name);
}

If the backup mechanism of a particular directory service is not suitable for this purpose, directory services typically offer an API that can be invoked to obtain the necessary attribute information associated with each object. The attribute information could then be read using the API, and stored in a disk file.

When the move of the subtree will cross schema boundaries, the present invention 'reconciles' the two schemas to ensure that all objects and attributes can be successfully moved from the source directory tree to the destination directory tree. The first reconciliation process occurs at block 86 where the global attributes of the two schemas are compared. If the source directory schema contains attributes that do not exist in the destination directory schema, then at block 88, such attributes are copied to the destination directory schema. Pseudo code suitable for comparing the schemas and adding the appropriate attributes is as follows:

while (more attributes in the source schema)
{
    if (source attribute is NOT defined in destination schema)
    {
        add attribute definition to destination schema
    }
    else
    {
        if (source attribute does NOT equal destination attribute)
        {
            Warn users schema can not be reconciled
        }
    }
}

At block 90, the source and destination directory schemas are compared to ensure that the class definitions of the objects in the subtree match the class definitions for those objects in the destination directory tree. If they do not, then at block 92 the class definitions associated with the destination tree schema are modified. This reconciliation process includes ensuring that the classes associated with the destination directory tree include the same attributes as the classes associated with the source directory tree. This process will include adding any classes that exist in the source directory schema to the destination directory schema as necessary to support any of the objects in the subtree. A processing segment suitable for reconciling the classes is as follows:

```
while (more classes in the source schema)
{
    if (source class is NOT defined in destination schema)
    {
        add class definition to destination schema
    }
    else
    {
        if (source class does NOT equal destination class of
            same name)
        {
            If (source class has optional or mandatory attribute
                (s) not in destination class)
            {
                Add attribute as an optional attribute to the des-
                    tination class
            }
            If (source class has different flags, superclasses,
                containment or naming rules)
            {
                Warn users schema can not be reconciled
            }
        }
    }
}
```

At block 93, if a mutation is necessary, the destination schema is analyzed to ensure that the class of the object-type to which the object will be mutated contains the same attributes as the original class of the object prior to its mutation. For example, if the object was an ORGANIZATION-type object prior to its mutation to an UNKNOWN-type object, and it will be mutated from an UNKNOWN-type object to an ORGANIZATION UNIT-type object, the process ensures that the class associated with an ORGANIZATION UNIT-type object contains the same attributes as the class associated with an ORGANIZATION-type object. This is done to eliminate potential containment rule violations during the mutation. Pseudo-code suitable for reconciling classes involved in the mutation is as follows:

```
if (attribute in original class is NOT in target class)
{
    add attribute in original class to target class definition as
        an optional attribute.
}
```

At block 95 the subtree is restored from the disk drive to an intermediate location in the destination tree. This intermediate location will be at the same relative location to the root-most object of the destination tree as the original relative location of the subtree to the root-most object of the source tree. If necessary, "shell" or empty parent objects will be created and temporarily added to the destination tree to which the subtree will be subordinate to ensure the subtree is at the same relative location in the destination directory tree. This intermediate move of the subtree is made for referential integrity, to ensure attribute links to other data in the subtree are not lost. Such an intermediate move is implementation dependent, and may not be necessary when such attribute links can properly be modified without resorting to an intermediate move. Pseudo-code suitable to move the subtree to this intermediate location is as follows:

```
While (moreObjectsToBeRestored)
{
    DSRestoreObject(name);
}
```

At block 96 the subtree is moved from the intermediate location to its final location, such that the root object of the subtree is immediately subordinate to the object identified as the destination location. A processing segment suitable to accomplish this is as follows:

DSMoveSubTree(subTreeRootMostObjeciName, newParentName);

At block 98, if mutations occurred at block 76, the root object of the moved subtree, and any objects subordinate to that object which had been changed or mutated to an UNKNOWN object are now mutated to an object type which will comply with the containment rules. For example, if the destination object was an Organization Unit-Type object, the root object of the subtree will be changed to an Organization Unit-Type object, since an Organization Unit-Type object can be subordinate to another Organization Unit-Type object. Pseudo-code suitable to mutate the object type from the UNKNOWN object type to the appropriate object type is as follows:

name =GetNameFromNamingAttributeOfOldObjectType( );
PutNameInNamingAttributeForTheNewObjectType(name);
MutateTheObjectToTheNewObjectType( );

If the requested operation was a move operation then the moved subtree will be pruned from the source tree. By pruning it is meant that the subtree will be removed from the source tree. Pseudo-code suitable for the prune operation is as follows:

```
RemoveSubTree( )
{
    while (moreObjectsToBeDeleted)
    {
        DSRemoveObject(name);
    }
}
```

It is possible that certain steps in the process depicted in FIGS. 4*a* and 4*b* can be omitted depending on the circumstances associated with the move. For example, if the source tree and destination trees are the same tree, and the move is within the same schema, but the move would otherwise be prohibited because of containment rule violations, it is possible that steps 78, 86, 88, 90 and 92 can be omitted. On the other hand, if the move of the subtree will cross schemas, but would not be prohibited because of containment rule violations, it is possible that steps 76, 93, 94 and 98 can be omitted.

The present invention greatly eases network entity administration by allowing moves of groups, or subtrees, of objects within a tree or to another directory tree in a seamless and automated fashion. An operator need not manually create and enter the attribute information associated with each object, but rather, if implemented using a graphical user interface could merely drag and drop a subtree of objects from a source location to a destination location. Moreover, the present invention allows movements of subtrees that would otherwise violate containment rules by mutating the objects as necessary such that the objects will comply with the schema containment rules. The present invention also ensures that all attributes associated with the objects exist in the schema associated with the destination tree.

The foregoing description of preferred embodiments of the invention has been presented for purposes of illustration and description. It is not intended to be exhaustive or to limit the invention to the precise form disclosed. Obvious modifications or variations are possible in light of the above teachings. For example, while the present invention has been described with reference to a network directory service, the invention could be applied to other hierarchical tree structures of objects defined by a schema. Moreover, while the preferred embodiments have been described with respect to a distributed directory tree, the invention would be equally applicable to a non-distributed directory tree. The embodiments were chosen and described in order to best illustrate the principles of the invention and its practical application to thereby enable one of ordinary skill in the art to best utilize the invention with various embodiments and with various modifications as are suited to the particular use contemplated. It is intended that the scope of the invention be defined by the claims appended hereto.

What is claimed is:

1. A method for copying a subtree from a source location to a destination location irrespective of object containment rules, comprising:

receiving an input signal identifying a subtree at a source location, the subtree including a parent object and existing in a hierarchical tree of objects, wherein object containment rules prohibit certain parent/child relationships among the objects;

receiving an input signal identifying a destination location in a destination tree to which the subtree is to be copied, the destination location including a destination object to which the subtree will be subordinate;

changing a first class definition of the parent object of the subtree to a second class definition sufficient to comply with object containment rules; and copying the subtree from the source location to the destination location.

2. A method according to claim 1, further comprising removing the subtree from the source location.

3. A method according to claim 1, further comprising determining if a name associated with an object in the subtree matches a name of an object in the destination tree, and if so, renaming the object in the subtree to a name which does not match a name of an object in the destination tree.

4. A method according to claim 1, wherein the subtree is being copied from a source tree that is different from the destination tree, and wherein the changing the parent object step comprises changing the parent object of the subtree from a first object type to an unrestricted object type; determining if a schema associated with the destination tree matches a schema associated with the source tree and if not, modifying the schema associated with the destination tree to include one of a class and an attribute present in the schema associated with the source tree; and modifying the parent object of the subtree from an unrestricted object type to a second object type that can be subordinate to the destination object without violating object containment rules.

5. A method according to claim 4, wherein the copying the subtree step further comprises determining if the first object type includes an object attribute that is not present in the second object type and if so, modifying a class associated with the second object to include the object attribute.

6. A method according to claim 1, wherein the copying the subtree step comprises copying the subtree from the source location to an intermediate location in the destination directory tree that is at a same relative location in the destination directory tree to the root-most object of the destination directory tree as the relative location of the subtree in the source directory tree to the root-most object of the source directory tree, copying the subtree to the destination location, and removing the copy of the subtree from the intermediate location.

7. A computer readable medium, having encoded thereon a computer program operative to perform the method of claim 1.

8. A method according to claim 1, wherein the source directory tree and the destination directory tree are the same directory tree.

9. A computer system operative to execute code segments capable of performing the method of claim 1.

10. A method for copying a subtree from a source directory tree to a destination directory tree regardless of object containment rules associated with the destination directory tree, comprising:

receiving a request to copy a subtree from a source location in a source directory tree;

receiving an identification of a destination object in a destination directory tree to which a parent object of the subtree will be immediately subordinate;

changing an object type of the parent object of the subtree such that its location immediately subordinate to the destination object does not violate object containment rules associated with the destination directory tree; and copying the subtree to a location in the destination directory tree such that the parent object of the subtree is immediately subordinate to the destination object.

11. A method according to claim 10 further comprising removing the subtree from the source location.

12. A method according to claim 10, wherein the copying step comprises copying data associated with objects in the subtree to a first storage medium; determining if a schema associated with the destination directory tree differs from a schema associated with the source directory tree, and if so, modifying the schema associated with the destination directory tree to include one of a class and an attribute that exists in the schema associated with the source directory tree; and restoring the data associated with objects in the subtree from the first storage medium to the appropriate location in the destination directory tree.

13. A method according to claim 10, further comprising determining if a name associated with an object in the subtree matches a name of an object in the destination directory tree, and if so, renaming the object in the subtree to a name which does not match a name of an object in the destination directory tree.

14. A method according to claim 10, wherein the determining a subtree step comprises displaying a graphical representation of the objects in the source directory tree on a display device, and receiving an input from an input device identifying the parent object of the subtree.

15. A method according to claim 10, wherein the copying the subtree step comprises changing at least the parent object of the subtree to a restriction-free object type, moving the subtree to be immediately subordinate to a root-most object of the destination directory tree, moving the subtree to the location in the destination directory tree such that the parent object of the subtree is immediately subordinate to the destination object, and changing at least the parent object of the subtree to from a restriction-free object type to a second object type that can be subordinate to the destination object without violating object containment rules.

16. A computer readable medium, having encoded thereon a computer program operative to perform the method of claim 9.

17. A method according to claim 10, wherein the source directory tree and the destination directory tree are the same directory tree.

18. A computer system operative to execute code segments capable of performing the method of claim 10.

19. A method for copying a subtree from a source location to a destination location, comprising:

receiving an input signal identifying a subtree at a source location, the subtree including a parent object, at least one child object, and existing in a hierarchical tree of objects, the subtree having associated therewith a first schema containing class definitions operative to define the objects of the subtree;

receiving an input signal identifying a destination location to which the subtree is to be copied, the destination location including a destination object to which the subtree will be subordinate, the destination location having associated therewith a second schema containing a class definition operative to define the destination object;

adding at least one of a class and an attribute that exists in the first schema to the second schema; and copying the subtree from the source location to the destination location.

20. A method according to claim 19, wherein the source location is in a source directory tree and the destination location is in a destination directory tree that is different from the source directory tree.

21. A method according to claim 19, wherein the adding step further comprises adding a plurality of attributes from the first schema to the second schema, and adding a plurality of classes from the first schema to the second schema.

22. A method for copying a subtree from a source location to a destination location, comprising:

receiving an input signal identifying a subtree at a source location the subtree including a parent object, at least one child object, and existing in a hierarchical tree of objects, the subtree having associated therewith a first schema containing class definitions operative to define the objects that compose the subtree;

receiving an input signal identifying a destination location to which the subtree is to be copied, the destination location including a destination object to which the subtree will be subordinate, the destination location having associated therewith a second schema containing a class definition operative to define the destination object;

changing the class definition of the second schema to be operative to define the first schema; and copying the subtree from the source location to the destination location.

23. A method according to claim 22, wherein the source location is in a source directory tree and the destination location is in a destination directory tree that is different from the source directory tree.

24. A method according to claim 22, wherein the changing step further comprises adding a plurality of attributes from the first schema to the second schema, and adding a plurality of classes from the first schema to the second schema.

* * * * *